Figure 2:
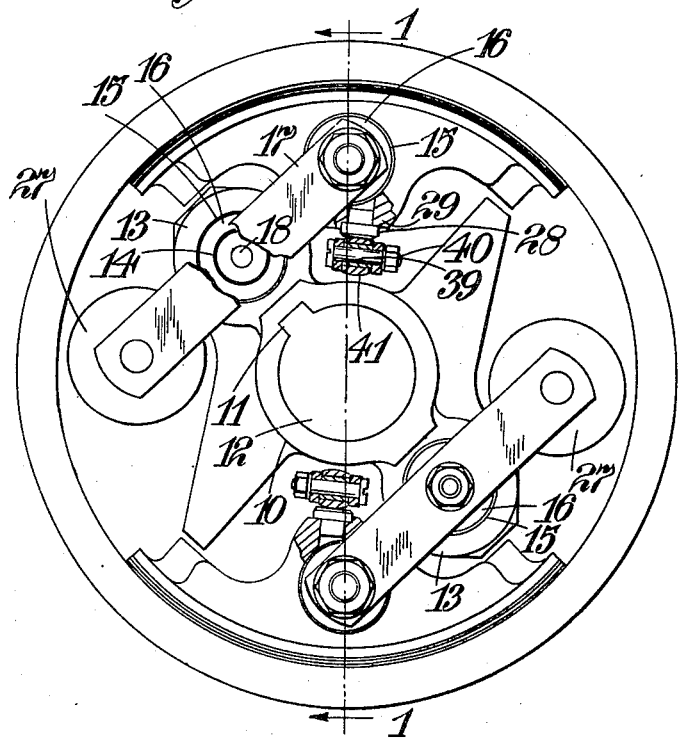

Feb. 26, 1957         C. W. CHAPMAN         2,782,893
FRICTION CLUTCHES WITH TORSIONAL RESILIENT MOUNTINGS
Filed Jan. 13, 1953                            2 Sheets-Sheet 1
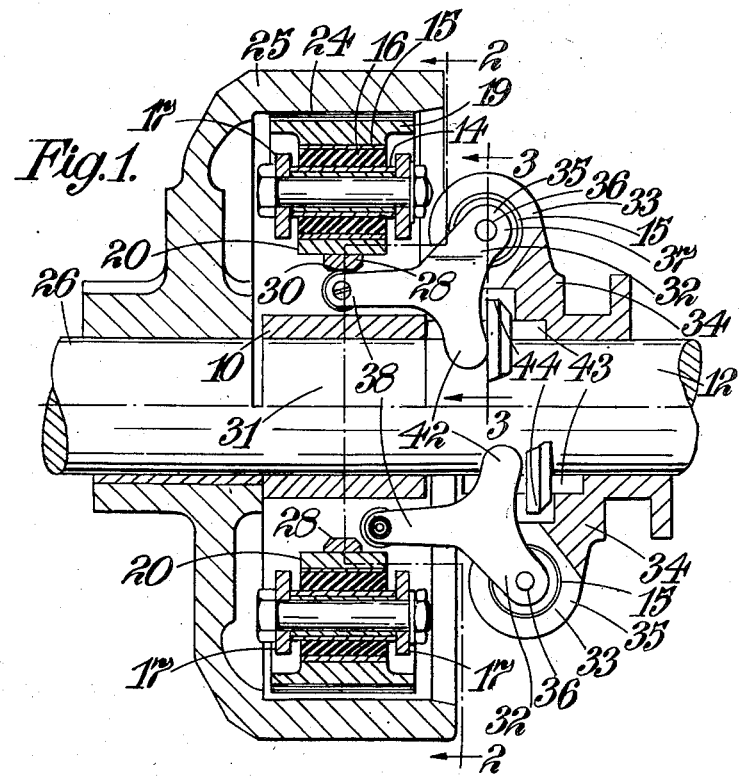
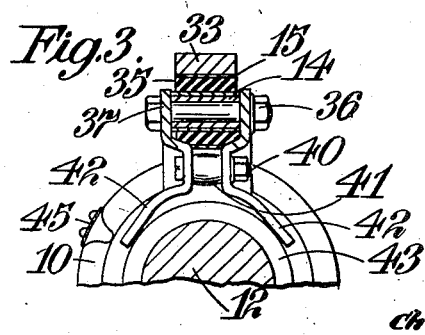
Inventor
Charles Wallace Chapman

United States Patent Office 2,782,893
Patented Feb. 26, 1957

2,782,893

FRICTION CLUTCHES WITH TORSIONAL RESILIENT MOUNTINGS

Charles Wallace Chapman, Burstow, near Horley, England, assignor to Compression Ignition Limited, Twickenham, England, a British company Application January 13, 1953, Serial No. 331,085

Claims priority, application Great Britain January 25, 1952

6 Claims. (Cl. 192—76)

This invention relates to friction couplings such as clutches or brakes (hereinafter referred to as friction couplings) and of the kind comprising friction elements so mounted as to be capable of relative movement in a direction to bring their friction faces into and out of engagement, a member arranged for actuation in one direction by a force applied by an operator through a suitable transmission, and when so actuated effects engaging movement of the friction faces and resilient means arranged to return the friction faces to a disengaged position, when said force is discontinued.

According to this invention a friction coupling of the kind referred to is characterised in that said transmission comprises a pivoted element and in that the resilient means for effecting disengagement of the friction pairs comprises a torsionally resilient element formed from rubber or non-metallic rubber-like material connected between the pivoted element and a part on which the element is mounted. For example the resilient element may be of the known type comprising two sleeves between which is bonded rubber or rubber-like material one of which sleeves is fixed to the pivoted element and the other to a part on which the element is mounted.

One form of friction coupling according to the invention comprises a driven or stationary element, a driving element arranged substantially co-axially with the driven or stationary element, a plurality of arms or links each pivotally connected through said torsionally resilient element to the driving element and extending outwardly therefrom, a coupling shoe pivoted to the outer end of each of said arms or links, operator actuated means for imparting movement to said shoes or arms so as to bring the shoes into engagement with the driven or stationary element against the torsional resilience of said resilient element, the disengagement of the coupling being effected by the stored up energy in said resilient means after the operator actuated means are released.

The aforesaid shoes are preferably pivotally connected to their arms or links each through a torsionally resilient element. The invention is further characterised in that the operator actuated means for engaging the coupling is arranged to be resiliently yielding so as to follow up wear of the friction surfaces.

The operator actuating means may be so arranged that, when the coupling is engaged or disengaged, no external operating force is necessary to maintain the state of engagement or disengagement. For this purpose the operator actuating means may comprise a part which is axially movable with respect to the driving and driven or stationary elements so as to be brought into or out of overlapping relationship with said shoes or parts connected therewith, cam means being provided between said shoes and actuating member whereby axial movement of the latter imparts radial movement to the shoes.

The operator actuated means is further arranged so that the engagement of all shoes can be readily adjustable from a single point preferably without the recourse to tools.

The arms connecting the shoes to the driving element may extend on the opposite sides of their pivot axes to the shoes and carry counter-weights so as to partially, completely, or over counteract the effect of centrifugal force on the shoes.

The following is a description of the invention as applied to a clutch reference being made to the accompanying drawing in which:

Figure 1 is a section on the line 1—1 of Figure 2, the top half of the figure showing the clutch engaged and the bottom half disengaged, Figure 2 is a section on the cranked line 2—2 of Figure 1, and Figure 3 is a section on the line 3—3 of Figure 1.

The driving element consists of a hub 10 arranged for keying 11 or otherwise securing to a shaft 12 which hub is provided with a number of outwardly projecting bosses 13 spaced circumferentially around it and each having fitted therein a resilient bearing. Each of these resilient bearings is preferably of the well-known type consisting of inner and outer metal sleeves 14 and 15 with rubber or other resilient material 16 in the annular space between the sleeves. The rubber is preferably radially pre-stressed and bonded to the sleeves in the well-known manner. The outer sleeves 15 of the bushes are a force fit or otherwise secured in the bosses of the driving element to prevent their movement therein whilst pairs of parallel links 17 are rigidly clamped by through bolts 18 against the ends of the inner sleeves 14 so that the links 17 and inner sleeves 14 must move as one. These links extend laterally of the bosses and may be arranged to point either forwardly or backwardly with respect to the direction of rotation. Shoes 19 preferably of substantially symmetrical shape have each a boss 20 on the inner side carrying in a similar manner to the bosses on the hub corresponding resilient bearings the inner sleeves 14 of which are clamped to the parallel links 17, there being as many shoes 19 as bosses 23 on the hub 10. The outer faces of the shoes are preferably faced with renewable friction material 24.

The driven or stationary element, according to whether the mechanism is a clutch or brake, is preferably in the form of a drum 25 secured, in the case of a clutch coupling, to a shaft 26, pulley or the like, and in the case of a brake to some stationary frame. The internal circumferential surface of the drum 25 surrounds the shoes 19 of the driving element which are arranged to co-act with it when the coupling is engaged.

In assembling, the links 17, carrying the shoes 19 on the bosses 13 of the hub 10 of the driving element, are clamped to the inner sleeves 14 of the hub bearing so that at rest the shoes 19 are held clear of the inner surface of the drum 25 and a definite radial force is required to urge the shoes 19 into contact with the drum 25 against the torsional restraint of the rubber in the bearings on the hub. If the speed of operation is such that the centrifugal force acting on the shoes 19 is sufficient to urge them into contact with the drum 25 against the torsional restraint of the hub bearings, then counter-weights 27 may be fitted to extensions of the links 17 on the side of the hub bearings remote from the shoes.

In order to engage the coupling it is therefore necessary to force the shoes outwards by external means to make them co-act with the inner surface of the drum 25. In a preferred arrangement for this purpose each shoe is provided on its inner surface with a pad 28 to which pressure may be applied to force the shoe outwardly into engagement with the drum. These pads preferably take the form of hardened steel inserts secured in bosses 29 to the under surface of the shoes so that the face 30 of the pad is substantially at right angles to a radial line 31 drawn from the centre of the coupling through the centre of the pad. The pad may however be adjustably mounted on the shoe so as to be movable towards or away from the axis of the coupling, for example it may be provided with a screw-threaded shank which engages a threaded hole in the boss 29 and is held in the adjusted position by a lock nut (not shown).

The mechanical means for applying radial pressure to the pads 20 to force the shoes 19 into engagement preferably takes the form of specially shaped levers 32 carried from bosses 33 on a slidable operating sleeve 34 with means (not shown) for sliding the sleeve towards the coupling to effect engagement and away from the coupling to effect disengagement. This slidable sleeve 34 carries as many bosses 33 around it as there are shoes 19 in the coupling and the sleeve is constrained from rotation relative to the driving element 12 by a feather key or the like (not shown) so that each boss is always substantially in line with the pad 28 of its corresponding shoe. Each boss 33 on the operating sleeve 34 is provided with a resilient pivot bearing 35 similar to but generally smaller than those on the driven element and shoes. The outer sleeves 15 of those bushes are pressed or otherwise secured in the bosses 33 of the operating sleeves 34 and the specially shaped levers preferably consist of parallel shaped plates clamped by through-bolts 36 or the like to the inner sleeves of the resilient bearing in the bosses 33 of the operating sleeve 34. These plates are of roughly triangular form, one corner 37 of each plate being clamped to the inner sleeve 14 of a bearing in the operating sleeve and another corner 38 protruding axially into the coupling to terminate under the shoe pads when in the engaged position. The ends of the levers at the coupling end are separated by a distance-piece 39 clamped by a through-bolt 40 or the like and a roller 41 preferably of barrel form and hardened is rotatably mounted on the distance piece.

The third corners 42 of the levers are splayed apart and rounded as seen in Figure 3 and the lever is so shaped that when assembled these third rounded corners are substantially in the same plane as the axes of the torsionally resilient bearing carried by the operating sleeve when the coupling is engaged. The operating sleeve is provided with an internally threaded bore which is engaged by an externally threaded tubular extension 43 which, when the rollers 41 engage the pads 28, abut the end of the hub 10. A ring nut 44 is screwed onto this tubular extension 43 and the rounded third corners 42 of the shaped plate levers are arranged to abut against the face of this ring nut 44. The ring nut is preferably knurled or grooved on its outer circumference so that it can be turned by hand and held in any position by a simple catch 45 mounted on the hub 10. Each operating lever 32 can thus be likened to a form of bell crank lever resiliently pivoted to the operating sleeve 34 and with a roller 41 at the end of the lever nearest to the coupling with an abutment of the lever operating against the face of the ring nut 44. Those faces of the third corners which are engaged by the ring nut may be provided with adjustable abutments (not shown) movable towards or away from the nut.

When the ring 44 moves to the right to the clutch disengaged position and each roller 41 is moved laterally clear of the pad 28, the torsional resilience of each bearing 35 is such that the arm 42 of each lever tends to swing clear of the ring 44 leaving a gap as shown in the lower part of Figure 1, and the roller 41 takes up a position corresponding to that it assumes for full clutch engagement.

It will be appreciated that with this arrangement that by adjusting the ring 44 to vary the aforesaid gap, the extent of yield of the roller inwardly, upon engagement with the pad and before the arm 42 engages the ring 44, may be varied and thus the extent of pressure of the shoes on the drum may also be varied. Thus the torque which can be transmitted when the coupling is engaged can be increased by screwing the ring nut 44 towards the coupling and correspondingly the torque which can be transmitted is reduced by screwing the ring nut further away from the coupling. It will be appreciated that since the pivots of the levers consist of resilient bearings, when the coupling is engaged these bushes are deflected so that the load is applied to the shoe in a spring-like manner which will automatically follow up a certain degree of wear. It will further be appreciated that when the coupling is fully engaged there is no end force tending to move the sliding sleeve. The same applies when the coupling is fully disengaged. Movement outwards of the operating levers due to centrifugal action when the coupling is disengaged may be restricted by the torsional restraint of the resilient bushes in the operating sleeve, but in addition, if desired, stops (not shown) on the sleeve 34 or hub 10 may be arranged to limit the outward movement of the levers.

Whereas in the above description the element carrying the shoe has been referred to as the "driving element" and the drum-like member as the "driven element," it will be appreciated that the drum member may in fact be the driving member and the shoe carrying member be the driven member.

I claim:

1. A friction coupling comprising two rotatable members, a drum fixed to one of said members, a hub fixed to the other, a number of friction shoes disposed within said drum, a supporting arm, a pivotal connection securing each said shoe to said supporting arm, a pivotal connection securing each supporting arm to said hub, each of which pivotal connections comprises a torsionally resilient bush arranged with its axis parallel to the axis of rotation of the coupling, and which torsionally resilient connections on said bush are arranged to tend to withdraw the shoes from the drum, an operator controlled member having associated therewith a number of adjustable parts arranged respectively to engage said shoes and all engaging an abutment adjustably mounted on the control member, pivotal connections between said adjustable parts and the control member which connections comprise torsionally resilient bushes tending to move said adjustable parts out of engagement with said abutments and into a clutch engaging position.

2. A friction coupling according to claim 1 wherein said operator controlled member comprises a sleeve slidable axially along one of said rotatable members and on which said adjustable parts are mounted to swing about axes transverse to the axis of rotation of the coupling and which parts and the portions of; the shoes they engage are so shaped that axial movement imparted to the sleeve imparts radial movement to said shoes to an extent governed by the initial adjustment of said abutment.

3. A friction coupling according to claim 1 wherein said adjusting means comprises a sleeve axially slidable along one of the rotatable members and wherein a number of lever arms pivotally carried on the sleeve by torsionally resilient bushes mounted with their axes transverse to the axis of rotation of the coupling a part of each of which lever arms is adapted to be brought, by the axial movement of the sleeve into engagement with a part of the shoes which engaging parts are so shaped that said axial movement imparts radial movement to the shoes and another part of which lever arm on the sleeve is engageable by said abutment on the sleeve whereby the radial position of the first said part of the lever arm may be adjusted in relation to said axis of rotation.

4. A friction coupling according to claim 1 wherein said adjusting means comprises a sleeve having one part thereof externally threaded and is axially slidable along one of the rotatable members and wherein an internally threaded abutment ring engages said threaded portion, and wherein a number of lever arms are carried on said sleeve each by a torsionally resilient bush arranged with its axes transverse to the axis of rotation of the coupling, a part of each of which lever arm is arranged to engage said abutment ring and another part is arranged to be brought, by the axial movement of the sleeve, into engagement with a part of one of said shoes which engaging parts are so shaped as to impart radial movement to said shoe by axial movement of the boss.

5. A friction coupling according to claim 1 wherein each of said supporting arms has a part thereof extending to the opposite side of said pivotal connection to the shoe and has secured thereto a weight so as partly to counterbalance the centrifugal force on said shoe.

6. A friction coupling according to claim 1 wherein each said torsionally resilient bush comprises inner and outer metal sleeves between which is disposed a rubber bush and each of which supporting arms comprise two parallel links arranged on either side of said inner metal sleeve of the bush in the hub portion and on either side of a bush in the shoe and clamped to the sleeves by bolts passing through the inner sleeves and through holes in the links, wherein the outer sleeve of one of said bushes is fixed in the hub portion and the outer sleeve of the other bush fixed in said shoe.

References Cited in the file of this patent

UNITED STATES PATENTS

| 1,312,776 | Bridge et al. | Aug. 12, 1919 |
| 2,375,909 | Fawick | May 15, 1945 |
| 2,626,034 | Fawick | Jan. 20, 1953 |

FOREIGN PATENTS

| 27,047 | Austria | Feb. 20, 1906 |
| 609,550 | Great Britain | Oct. 4, 1948 |